Nov. 29, 1938.   W. C. KEYS   2,138,176
RESILIENT MOUNTING FOR ABSORBING VIBRATIONS
Filed Oct. 10, 1935
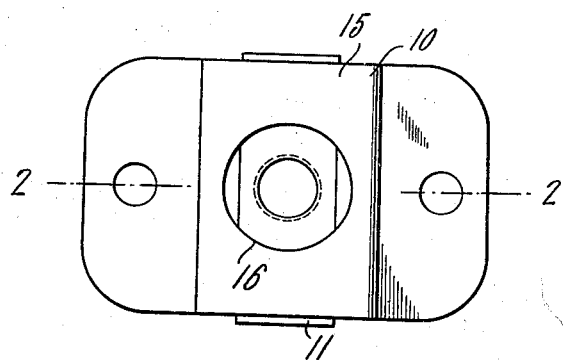
Fig. 1
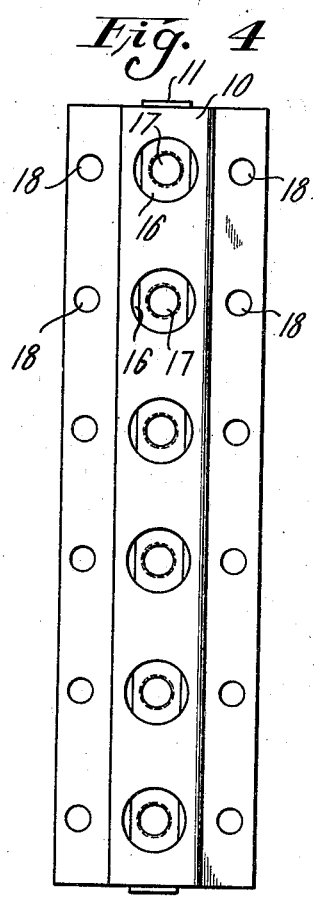
Fig. 4
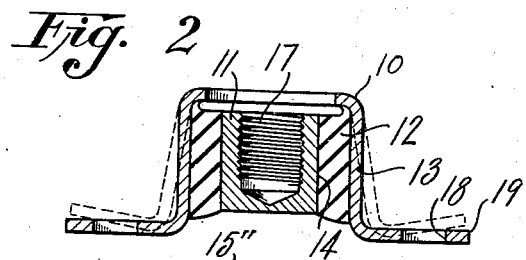
Fig. 2
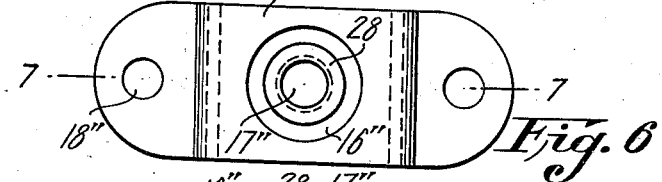
Fig. 6
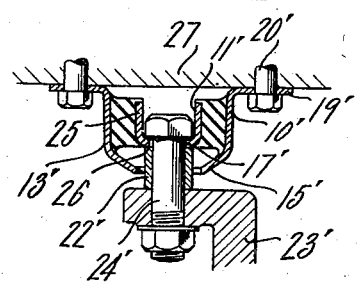
Fig. 7
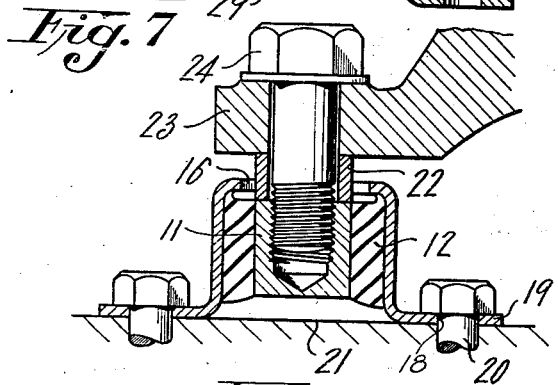
Fig. 3
Fig. 5
INVENTOR.
WALTER C. KEYS
BY Walter L. Pipes
ATTORNEY.

Patented Nov. 29, 1938

2,138,176

UNITED STATES PATENT OFFICE 2,138,176

RESILIENT MOUNTING FOR ABSORBING VIBRATIONS

Walter C. Keys, Detroit, Mich., assignor to United States Rubber Products, Inc., New York, N. Y., a corporation of Delaware Application October 10, 1935, Serial No. 44,355

11 Claims. (Cl. 248—358)

This invention relates to improved resilient mountings for absorbing or reducing the transmission of vibration between two connected bodies, and the method of making the mounting. This invention relates more particularly to a resilient mounting having resilient material, such as rubber, inserted between and bonded to the members of the mounting and in which the rubber absorbs the major vibrations between two connected bodies by being subjected to shearing stresses as opposed to compressional stresses. Briefly this invention comprises a resilient mounting having an outer hollow metal member and an inner metal member extending within the outer member. The inner member is floated within the outer member by rubber which is bonded to and between the surfaces of these members. The metal members are preferably made of stamped, pressed, or rolled metal. The outer member is provided with straight sides having a cross portion extending therebetween. Preferably the outer member is made in the form of a channel and the inner member is provided with sides parallel with the sides of the outer channel member. In the manufacture of the mounting, the rubber in its unvulcanized state is inserted between the straight sides of the inner member and the outer member and is bonded to the opposite sides of the members by vulcanization of the rubber. In order to relieve the shrinkage stress in the rubber and to produce a better bond between the rubber and the metal parts, the sides of the outer hollow member may be bent inwardly to compress the rubber. A mounting of the above construction is particularly suitable for general use in mounting machines of a general type on their bases and as the metal parts may be made of stamped or pressed metal the mounting may be made economically. The mounting is also provided with means for preventing the respective parts which are secured to the machine and its foundation from becoming separated in the event the bond between the rubber and the metal parts should fail due to excessive overload, excessive heat or other abuses.

The above and other objects and advantages of this invention will be more fully understood by referring to the following description and the accompanying drawing in which:

Figure 1 is a plan view of a mounting embodying this invention;

Figure 2 is a cross-section of Figure 1 on lines 2—2;

Figure 3 is illustrative of the method of using the mounting shown in Figures 1 and 2;

Figure 4 is a modified form of the mounting illustrating a number of units joined together;

Figure 5 is a cross-sectional view of another modification of the mounting illustrating how it may be installed in an inverted position;

Figure 6 is a plan view of still another modification; and

Figure 7 is a cross-sectional view on line 7—7 of Figure 6.

As illustrated in the drawing the mounting comprises an outer hollow member 10 which may be made in the form of a channel, and an inner member 11 secured within the channel by resilient material such as rubber 12, which is inserted in the channel in its unvulcanized form and vulcanized to the sides 13 of the channel and the sides 14 of the inner member 11. The bottom or cross portion 15 of the channel 10 is provided with an aperture 16. The rubber 12 and the inner member 11 are nominally spaced from the bottom 15 so that the free vibration of the inner member will not be interfered with. As shown in Fig. 2, the inner member 11 is made of an elongated solid bar and is provided with a threaded socket 17 in alignment with the aperture 16 in the channel member 10. In order to mount the channel member 10 securing holes 18 are provided in the flanges 19 extending substantially at right angles to the sides 13 of the channel member 10.

After the vulcanization of the rubber the mounting has the form shown in dotted lines in Fig. 2. Subsequently the sides 13 of the mounting are bent inwardly, as shown in the full lines in Fig. 2. This operation compresses the rubber 12 and produces a better bond between the rubber and the metal parts.

The mounting shown in Fig. 4 may be constructed similarly to that shown in Figs. 1 and 2. The channel member 10 is made in an elongated form and is provided with a series of securing holes 18 in its flange and threaded sockets 17 in the inner elongated bar 11 which are located in alignment with the apertures 16 in the elongated channel 10. The mounting disclosed in Fig. 4 may be cut transversely in units, each unit having at least one transverse line of securing holes and conforming to the units shown in Figs. 1 and 2, or two or more of these units may be used together in their integral form in order to provide a mounting of greater strength as may be desirable.

As an alternative method of manufacturing the mounting shown in Fig. 4, the channel member 10 and the bar 11 may be assembled and the rubber 12 vulcanized between these parts before any securing holes, apertures or sockets are formed in either the channel member or the bar. After the rubber 12 has been vulcanized between the parts so as to form an elongated resilient mounting, the aligned securing holes 18, apertures 16 and socket holes 17 may be formed at any desired intervals. The elongated mounting may then be cut up so as to provide mountings of suitable strength and having properly spaced securing holes and sockets therein for various purposes.

Fig. 3 illustrates a method of mounting a machine upon one or more of the units shown in Figs. 1 and 4. Bolts 20 are passed through the securing holes 18 in the flange 19 for securing the channel 10 to a base or floor 21. A collar 22 is inserted through the aperture 16 in the bottom of the channel 10 and the base 23 of the machine is supported upon the collar 22. A securing bolt 24 extends through a bore in the base 23, and through the collar 22 and is threaded into the socket 17 of the bar 11. In this manner the bolt 24 clamps the members 11, 22 and 23 together and secures the machine base 23 to its foundation. If desirable, the collar 22 may be made integral with the inner member or bar 11.

The mounting illustrated in Fig. 5 is similar to the preceding types of mountings except that the inner member 11' is formed of a metal channel shape having its sides 25 parallel to the sides 13' of the outer channel member and its bottom 26 is spaced a greater distance from the bottom 15' of outer channel member 10' to provide a free space for the inner member 11' to vibrate within. This form of mounting is illustrated as being installed upon an overhead support 27. The flanges 19' are secured to the overhead support 27 by bolts 20'. The machine base 23' is secured to the inner member 11' by a bolt 24' which extends through an aperture 17' in the inner channel member 11' and through the collar 22' and a bore in the base 23'.

While the modification of this invention described in Fig. 3 is illustrated as being secured to an underfoot support, such as flooring, and the modification described in Fig. 5 is illustrated as being secured to an overhead support, it is evident that either of these modifications is suitable for use in either relation illustrated. In either case if the bond between the rubber and the metal part should fail due to excessive overload, excessive heat or other abuse, the base of the machine would be prevented from moving beyond the confines of the outer channel member. Referring to Fig. 3, in such event the inner member 11 would drop down upon the floor 21, and as illustrated in Fig. 5 the inner member 11' would drop down upon the bottom 15' of the channel 10' and would be retained thereby.

The modification of the invention illustrated in Figs. 6 and 7 is particularly suitable for mounting upon a vertical wall with the base of the outer member 10" attached to the wall. In this case the inner member 11" is made in the form of a T-shaped bar which is inserted in the channel member 10" with the stem 28 of the T extending outwardly through apertures 16" in the bottom of the channel 15" and with the head 29 of the T positioned within the channel and parallel to the bottom 15" of the channel in its inverted position. Rubber 12" is vulcanized between the bottom 15" and the head of the T bar 11". Attaching holes 17" and 18" are respectively provided in the T bar 11" and flanges of the channel member 10". This mounting like the preceding modification described also has the safety feature of retaining the base of the machine within the channel 10" in the event the bond between the rubber and the metal parts should fail. In such event the stem of the T bar 11" would fall upon and be supported by the periphery of the aperture 16" in the channel 10".

While the preferred modifications have been described it will be understood that the details as shown may be changed without departing from the spirit of the invention as defined in the appended claims.

Having thus described my invention what I claim and desire to protect by Letters Patent is:

1. A mounting for absorbing vibrations between two bodies, said mounting comprising an outer hollow metal member having sides and a cross portion extending between said sides, said sides having flanges thereon adapted to be attached to one body, an inner member extending within said hollow member and adapted to support the other body, said cross portion having an aperture therein for the reception of means for attaching said other body to said inner member, rubber interposed between and vulcanized to said hollow member and said inner member, said rubber and inner member being nominally spaced from said cross portion, and said rubber being adapted to be stressed in shear by the load transmitted from one body to the other.

2. A mounting for absorbing vibrations between two bodies comprising a channel shaped member formed from stamped or pressed metal and having a bottom and sides adapted to be attached to one body, an inner member interposed between the sides of said channel member and adapted to support the other body, rubber interposed between and vulcanized to the sides of said channel member and the sides of said inner member and adapted to be stressed in shear by the load transmitted from one body to the other, said rubber and said inner member being spaced from the bottom of said channel member, and said rubber being subjected to compression forces between said sides.

3. A mounting for absorbing vibrations between two bodies comprising a channel shaped member having a bottom and sides extending therefrom adapted to be attached to one body, an inner member interposed between the sides of said channel member and adapted to support the other body, rubber interposed between and vulcanized to the sides of said channel member and the sides of said inner member and adapted to be stressed in shear by the load transmitted from one body to the other, the shrinkage tension of said rubber due to vulcanization being relieved by bending said sides inwardly.

4. A mounting for absorbing vibrations between two bodies comprising a channel shaped member having a bottom and sides extending therefrom adapted to be attached to one body, an inner member interposed between the sides of said channel member and adapted to support the other body, said bottom having an aperture therein for the reception of means for supporting said other body on said inner member, rubber interposed between and vulcanized to the sides of said channel member and the sides of said inner member and adapted to be stressed in shear by the load transmitted from one body to the other, and said rubber and inner member being nominaly spaced from the bottom of said channel member.

5. A mounting for absorbing vibrations between two bodies comprising a channel shaped member having a bottom and sides provided with lateral flanges extending therefrom adapted to be attached to one body, an inner member interposed between the sides of said channel member and adapted to support the other body, said bottom having an aperture therein smaller than said inner member through which a connection may be made between said other body and said inner member, rubber interposed between and vulcanized to the sides of said channel member and the sides of said inner member and adapted to be stressed in shear by the load transmitted from one body to the other.

6. A mounting for absorbing vibrations between two bodies comprising a channel shaped member having a bottom, and sides provided with flanges extending outwardly therefrom and adapted to be attached to one body, an inner member interposed between the sides of said channel member and adapted to support the other body, said inner member having a socket therein, said bottom having an aperture therein opposite said socket, a collar extending through said aperture and around said socket, means secured in said socket and clamping said inner member, collar and other body together, rubber interposed between and vulcanized to the sides of said channel member and the sides of said inner member and adapted to be stressed in shear by the load transmitted from one body to the other.

7. A mounting for absorbing vibrations between two bodies comprising a channel shaped member having a bottom and sides extending therefrom and provided with flanges adapted to be attached to one body, an inner member interposed between the sides of said channel member and adapted to support the other body, said bottom having apertures therein for the reception of a means for attaching said other body to said inner member, rubber interposed between and vulcanized to the sides of said channel member and the sides of said inner member and adapted to be stressed in shear by the load transmitted from one body to the other, the shrinkage tension of said rubber due to vulcanization being relieved by bending said channel sides inwardly.

8. A mounting for absorbing vibrations between two bodies comprising a channel shaped member formed from bendable metal and having a bottom and sides, said sides being adapted to be attached to one body, an inner member interposed between the sides of said channel member and adapted to support the other body, rubber interposed between and vulcanized to the sides of said channel member and the sides of said inner member and adapted to be stressed in shear by the load transmitted from one body to the other, and said sides of said channel being adapted to be bent inwardly from their initial vulcanized positions to subject said rubber to compression forces.

9. A mounting for absorbing vibrations between two bodies comprising a channel shaped member having a bottom and sides extending therefrom and provided with flanges adapted to be attached to one body, an inner member interposed between the sides of said channel member and adapted to support the other body, said bottom having apertures therein for the reception of a means for attaching said other body to said inner member, rubber interposed between and vulcanized to the sides of said channel member and the sides of said inner member, said flanges extending at an acute angle to the vertical central plane passing through the longitudinal axis of the mounting when the mounting is in its initial state after being vulcanized, whereby upon the deflection of said channel sides inwardly the intermediate rubber is placed under compression and said flanges extend substantially perpendicularly to said vertical plane.

10. A mounting for absorbing vibrations between two bodies comprising a channel member having a bottom and sides adapted to be attached to one body and an inner member adapted to be attached to the other body, said inner member being suspended in rubber interposed between and bonded to the inner member and the channel member and spaced from the bottom of said channel member, said mounting having a series of sets of securing holes formed in both of said members at spaced intervals whereby said mounting may be cut intermediate said sets of holes in suitable lengths with the desired number of suitably spaced securing holes therein to provide mountings for different maximum loads.

11. A mounting for absorbing vibrations between two bodies comprising a channel shaped member having a bottom and sides extending from said bottom, said sides having flanges adapted to be attached to one body, an inner member interposed between the sides of said channel member and adapted to support the other body, said bottom having a series of apertures therein for the reception of means for attaching said other body to said inner member, rubber interposed between and vulcanized to the sides of said channel member and the sides of said inner member, said flanges having a series of securing holes formed therein in alignment with the openings in said bottom of said channel member, said flanges extending at an acute angle to the vertical central plane passing through the longitudinal axis of the mounting when the mounting is in its initial state after being vulcanized, whereby the mounting may be cut intermediate said sets of holes in suitable lengths with a desired number of suitably spaced securing holes therein to provide mountings for different maximum loads, and upon the deflection of said channel sides inwardly to their installed positions the intermediate rubber is placed under compression and said flanges extend substantially perpendicularly to said vertical plane.

WALTER C. KEYS.